United States Patent [19]

Harper et al.

[11] 3,871,190

[45] Mar. 18, 1975

[54] METHOD AND APPARATUS FOR FLASH FREEZING VARIOUS PRODUCTS

[75] Inventors: John D. Harper, Elgin, Ill.;
Frederick Breyer, Boca Raton, Fla.;
Richard Wagner, Darien, Ill.

[73] Assignee: Integral Process Systems, Inc., Park Forest, Ill.

[22] Filed: May 10, 1974

[21] Appl. No.: 468,816

Related U.S. Application Data

[62] Division of Ser. No. 516,505, Dec. 27, 1965, which is a division of Ser. No. 487,446, Sept. 15, 1965, Pat. No. 3,277,657.

[52] U.S. Cl. ................................................. 62/380
[51] Int. Cl. ........................................... F25b 19/00
[58] Field of Search ............ 62/65, 63, 64, 380, 374

[56] References Cited
UNITED STATES PATENTS
3,345,828  10/1967  Klee et al. ........................... 62/64 X Primary Examiner—William E. Wayner
Attorney, Agent, or Firm—Dressler, Goldsmith, Clement & Gordon, Ltd.

[57] ABSTRACT

A flash freezing system is provided in which articles to be frozen are transported through an elongated thermally isolated chamber. Liquid nitrogen is sprayed onto the articles where it flashes, at least partially, to gas which passes toward the article entrance end of the chamber. Pumping means is provided along with a suction inlet and discharge outlet in the chamber to recirculate the gas at a high velocity and the freshly generated gas mixes with the recirculated gas in a high velocity stream impinging on each article. Means are provided to withdraw a portion of the recirculated gas from the entrance end of the chamber.

1 Claim, 3 Drawing Figures

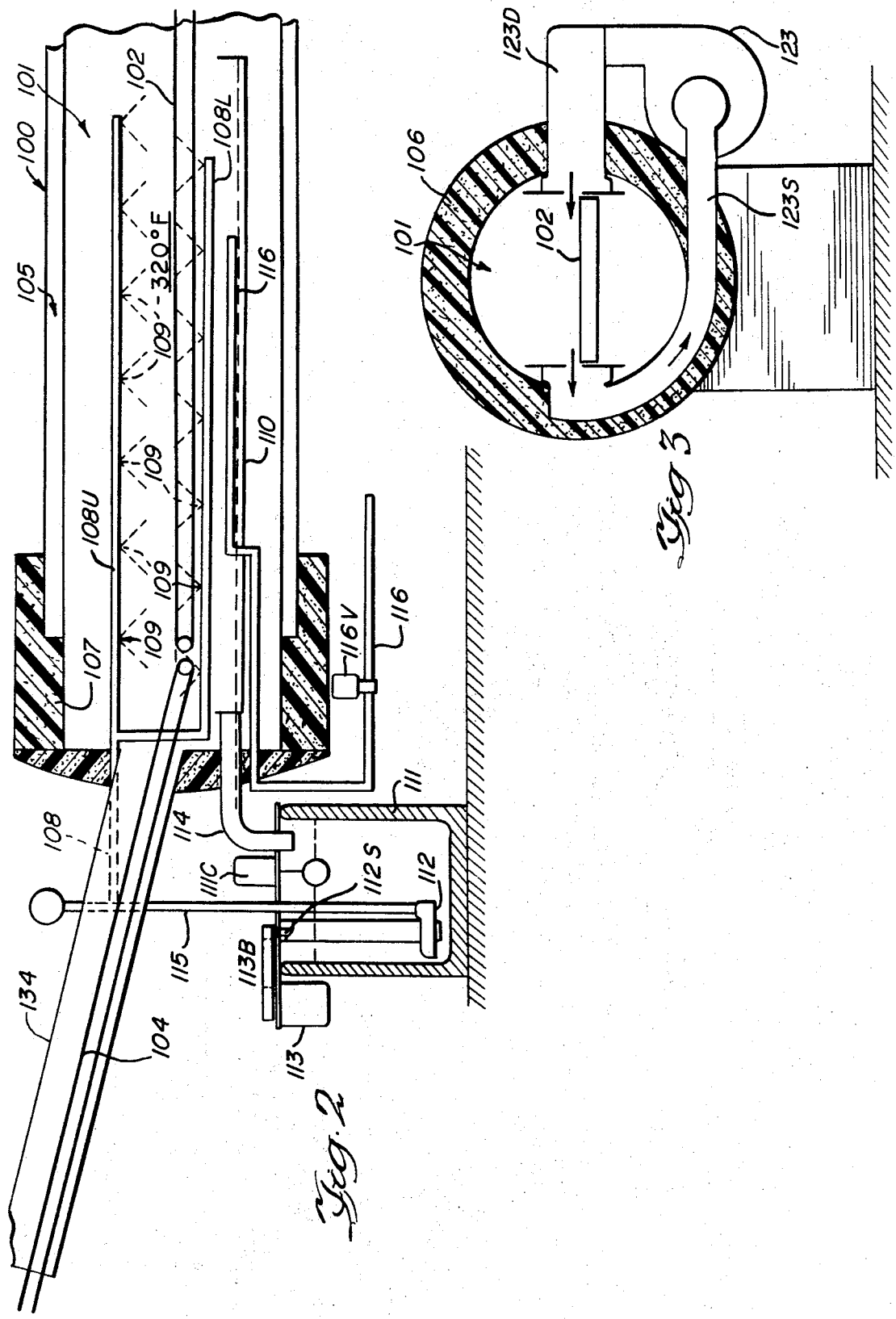

METHOD AND APPARATUS FOR FLASH FREEZING VARIOUS PRODUCTS

This application is a divsiion of application Ser. No. 516,505, filed December 27, 1965, which in turn was a division of application Ser. No. 487,446 filed September 15, 1965, now U.S. Pat. No. 3,277,657 issued October 11, 1966.

This invention relates to a method and apparatus for freezing both food and non-food products by the use of the latent heat of vaporization of liquid nitrogen and the specific heat of ultra-cold nitrogen gas. The application of the instant invention is particularly directed to the flash freezing of foods, which is by way of example only.

The present freezing methods, including blast freezing and immersion freezing techniques, are subject to many disadvantages including inefficiency of operation, length of time required to satisfactorily freeze the products, and the cost factor. In addition, the present methods are limited as to the amount of products that can be frozen in any given time period. A contributing factor to the reduction in efficiency is the lack of adequate insulation to permit maximum utilization of the fluid being used as the cooling medium. Heretofore, conventional insulating techniques have not been completely satisfactory and have substantially added to the cost of the coolant used.

Other problems encountered when employing the "blast freezing" method include the change in crystalline structure and the disturbance of the quality of the food product.

It can be appreciated that a system whereby food products can be instantaneously frozen in a continuous process at a price that would be economically feasible would be a boon, both to the food processor and the consumer who would like to have food products always available regardless of the season of the year.

In accordance with the present invention, there is provided a method and apparatus for the efficient and economical "instant freezing" of various products including those frozen foods presently available on the market. Other products would include meat, poultry, sea food, bakery products, and prepared foods. Examples of other uses for which the process may be utilized include the shrink fitting of bearings and the stress relieving of aluminum castings.

The method of this invention, in one aspect thereof, involves flash freezing of articles in a substantially thermally isolated chamber and includes the steps of transporting the articles along a process path into, through and out of said chamber, directing a spray discharge of liquid nitrogen against each article when at a downstream path region within the chamber to flash at least partially to gas for generating fresh gaseous nitrogen within the chamber, drawing off gaseous nitrogen from the chamber and returning some of it to the chamber to maintain a high velocity flow stream that impinges upon each article at an upstream region along the process path, and releasing some of the gaseous nitrogen to atmosphere after article impingement travel in the stream for maintaining atmospheric pressure substantially throughout the remainder of the chamber.

The method employed utilizes the latent heat of vaporization during the "flashing" of liquid nitrogen to a gas in the immediate vicinity of the product to be frozen. In accordance with one of the important aspects of this invention, the ultra-cold nitrogen gas is effectively utilized to aid in the freezing process by recirculating the gas over the product at high velocities to bombard and completely encompass the product to take advantage of the chilling effect of the fast moving gas.

In order to effectively utilize the latent and specific heat of the liquid and gaseous nitrogen the freezing process takes place in a chamber that is fully insulated by highly efficient insulation techniques involving drawing and maintaining a vacuum between spaced walls that surround the process chamber.

An example of the type of apparatus that can be used for practicing the method discussed above includes an insulated process chamber maintained at substantially atmospheric pressure at the regions through which the product to be frozen is moved on a continuously moving steel mesh or parallel wire conveyor. Liquid nitrogen entering the chamber is first discharged as a spray directly against the product and upon flashing to gas is drawn into a high velocity gaseous nitrogen stream that continuously recirculates along a path that impinges against the articles.

In the disclosed embodiment, cold gaseous nitrogen is passed transversely across the path of the moving food product in the main process chamber. This is a fast moving stream which is made up in part of freshly generated nitrogen gas vaporized from the liquid nitrogen spray that is discharged directly against the product. This combined gas stream is recirculated for repeated passage across the path of the moving food product or other article. A portion of the recirculated gas stream is bled off to regulate the pressure within the process chamber.

In this form, the inlet and outlet tunnels are arranged to provide a gradual outward flow of gaseous nitrogen. This exfiltration provides a certain pre-cooling and post-cooling effect and precludes entry of ambient air.

A particularly effective arrangement for insulating the main process chamber is disclosed. Concentric shells or sleeves having suitably spaced walls encircle and define the process. Vacuum is maintained in the annular region between these walls and all connections of the external components required for the liquid nitrogen system and the gaseous nitrogen recirculation system are made through insulated end spools so that the vacuum section is not broken or otherwise interrupted by external connections.

To accommodate thermal expansion and contraction, the outer shell is provided with a flexible joint at an intermediate region while the inner shell is unitary and connected to the outer shell only at its opposite ends. The flexible joint allows the outer shell to follow the expansion and contraction movements of the inner shell, with external supports for the outer shell facilitating its lengthwise sliding follower movement.

The temperature within the process chamber is sensed by a temperature transmitting means that serves to control the temperature within the chamber by regulating the flow of liquid nitrogen into the chamber.

It has been found that for certain applications, exposure of the food product for 2 to 6 minutes within the chamber is sufficient to lower the temperature of the product the desired amount. This range is merely exemplary since, depending on the speed of the conveyors and the length of the chamber, doughnuts can be exposed for a period of fifteen seconds and hams for ten minutes, which are the requisite times necessary to freeze them.

Other features and advantages of the present invention will be apparent from the following description and the attached drawings, in which:

FIG. 2 is a fragmentary lengthwise section through the downstream end of the apparatus; and FIG. 3 is a transverse section through the inlet end spool of the process chamber structure.

Figure 1:
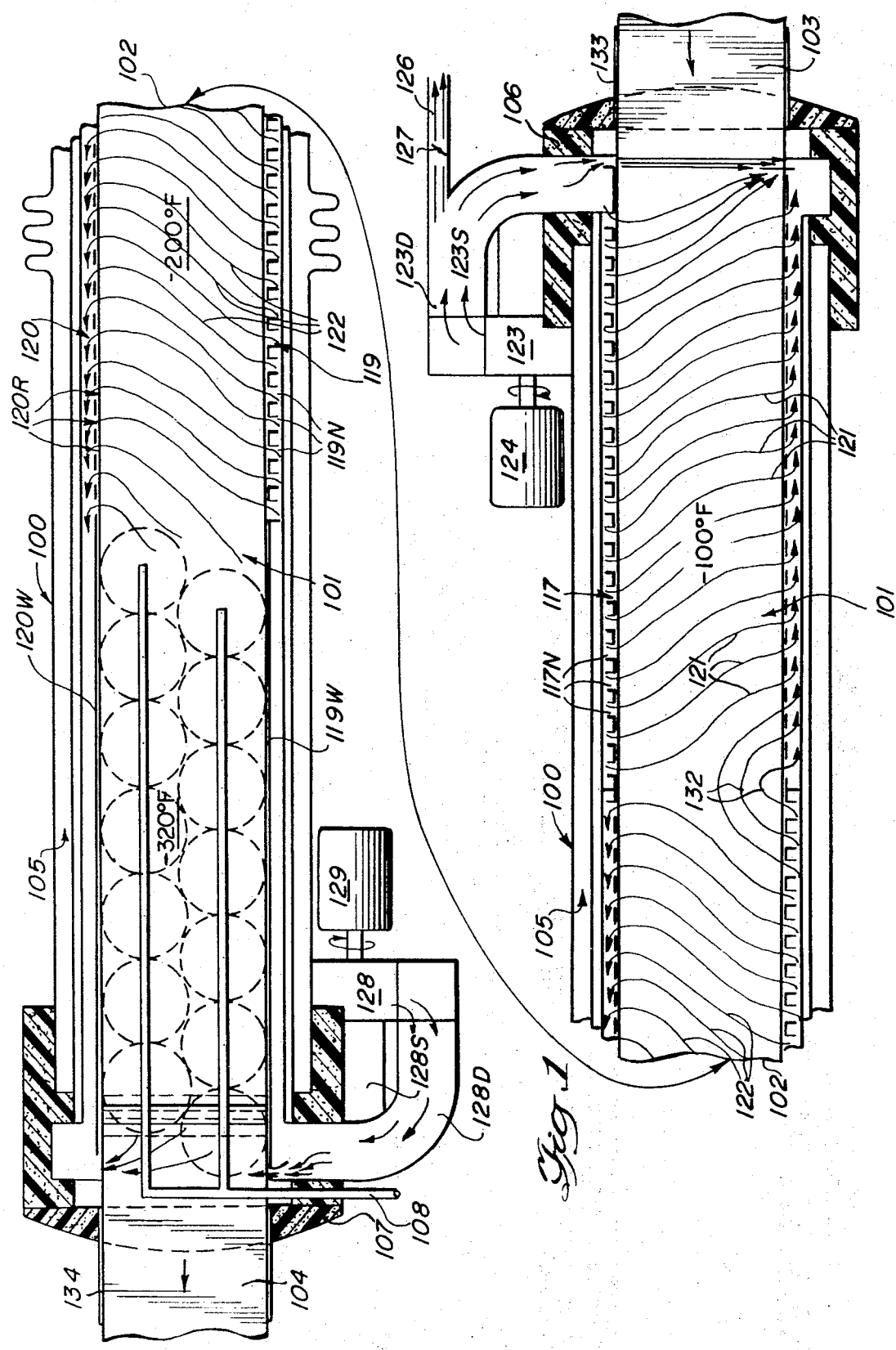
FIG. 1 is a diagrammatic plan sectional view through the complete apparatus.

A flash freezing liquid nitrogen system together with typical flow rates and temperatures is provided in diagrammatic FIGS. 1 to 3 for purposes of illustrative disclosure. Many structural features of the system are also incorporated in these diagrammatic figures. The system includes hollow housing structure 100 defining a substantially thermally islolated process chamber 101 having a conveyor 102 extending substantially full length therein and operating at a predetermined speed to advance products along a process path that leads through the process chamber in a direction from right to left as viewed in FIG. 1. An in line entrance conveyor 103 is shown leading into the process chamber at the right in FIG. 1 and an in line exit conveyor 104 is shown leading from the process chamber at the left in FIGS. 1 and 2. The housing structure 100 is configured to present an annular insulation space 105 completely encircling the process chamber and normally maintained at a vacuum level of less than 10 microns of mercury.

At the product infeed end, the housing structure is terminated in an insulated entrance spool 106 having a restricted mouth through which the entrance conveyor 103 extends and at the product delivery end, the housing structure is terminated in an insulated exit spool 107 having a restricted mouth though which the exit conveyor 104 extends. Spray discharge mechanism, as provided in this form, includes a cryogenic liquid supply line 108 feeding an upper pair of headers 108U and a lower pair of headers 108L arranged adjacent the downstream end of the process chamber and occupying about one-third of the length of the process chamber. A set of seven spray nozzles 109 are shown on each header, each issuring a wide angle hollow cone, solid or fan spray discharge. The precise number of nozzles per header can be varied depending upon the product to be frozen. The nozzles associated with the upper headers 108U are directed vertically downwardly and the nozzles associated with the lower header 108L are directed vertically upwardly. The spray patterns as shown in FIGS. 1 and 2 are in a staggered alternating close fit relation to span the entire width of the conveyor and progessively deposit atomized liquid droplets substantially uniformly against both the top and bottom faces of the articles. The conveyor 102 is of open mesh construction enabling necessary flowthrough for the upwardly directed nozzles associated with the bottom header. One of the features of the arrangement is the use of mass flow rates of cryogenic liquid substantially in excess of the mass rate at which liquid flashes to nitrogen within the chamber. The excess liquid emitted by the spray discharge is collected in a pan-shaped reservoir or tray 110 which underlies the conveyor 102 and the headers 108U and 108L adjacent the downstream end of the process chamber.

An arrangement for recirculating excess liquid to sustain the prescribed higher spray discharge rate is provided externally and includes a dewar 111 or other vacuum insulated vessel providing a sump for cryogenic liquid, a cryogenic pump 112 suspended in submerged relation in the cryogenic liquid in the dewar, a drive motor 113 mounted externally of the dewar and having a drive belt 113B connected to the exposed upper end of the pump drive shaft 112S. The pump 112 is illustrated as being of a centrifugal type and further particulars of its arrangement and construction are provided in a copending application entitled Cryogenic Pump, Ser. No. 479,825, filed Aug. 16, 1965, in the name of Richard C. Wagner. The disclosure of said application is specifically incorporated herein by this reference.

To complete the liquid recirculation system a drain line 114 leads from the collector pan 110 to the sump to return unused cryogenic liquid and a delivery line 115 leads from the discharge side of the pump and connects to the supply line 108 to the headers. The amount of liquid flashing to gas is related to the product flow rate through the process chamber and this amount must be constantly made up in order to sustain the spray discharge flow rate. A line 116 is shown which leads from a cryogenic liquid supply tank (not shown) exterior to the system, the line 116 having a solenoid control valve 116V and extending through the exit spool 107 to open directly into the collector pan 110 for supplying the make up liquid. Since the pressure at this external source and acting in the line 116 normally is greater than the pressure acting on the headers, the release of the make up liquid is accompanied by more pronounced flashing to vapor. The latent energy release associated with the pressure transition at the point of liquid release and evidenced by direct flashing to vapor is utilized in the present arrangement by connecting the make up line to empty at a point directly within the process chamber.

The process chamber 101 is shown provided with internal housing structure to define a first set of opposed transversely spaced high pressure and low pressure plenum chambers 117 and 118, respectively, adjacent and flanking the process path along the upstream end of the process chamber and a second set of opposed transversely spaced high pressure and low pressure plenum chambers 119 and 120, respectively, adjacent and flanking the process path along an intermediate region of the process chamber. In the case of the upstream set, the high pressure chamber 117 is provided with an array of control nozzles, as represented at 117N, and the low pressure chamber 118 is provided with a corresponding array of receiver openings 118R collectively to define a gas recirculation flow path that is oriented substantially transversely of the upstream end of the process path as represented by the flow arrows 121. Correspondingly, the high pressure chamber 119 of the intermediate set is provided with an array of control nozzles, as represented at 119N, and the low pressure chamber 120 is provided with a corresponding array of receiver openings 120R which define a gas recirculation flow path also oriented approximately transversely of the process path but moving in an opposite side to side direction, as represented by the flow arrows 122, to provide impingement against an opposite region of the articles as they progress along the process path.

A gas recirculation system is associated with the entrance spool 106 and includes and externally mounted fan 123 powered by a drive motor 124 and having a discharge conduit 123D extending laterally through the wall of the spool immediately adjacent the end of the hollow housing structure 100 and a suction conduit 123S which, as best shown in FIG. 3, extends partway internally of the spool 106 and emerges laterally at a lower elevation. It will be noted that the discharge conduit 123D from this gaseous recirculation system branches to feed an exhaust conduit 126 that is equipped with a damper type control valve 127 to relate the rate of release of exhaust gas to the rate at which liquid flashes to gas within the process chamber for maintaining desired temperature and pressure balance within the system. In the disclosed arrangement, the process chamber is maintained substantially at atmospheric pressure and the control of the exhaust rate may be accomplished either by regulating with pressure as a reference, though this requires unduly sensitive equipment, or by regulating with temperature as reference.

A corresponding gas recirculation system is provided at the discharge end of the process chamber and includes an externally mounted recirculation fan 128 powered by a drive motor 129 with the fan having its discharge conduit 128D entering laterally through the exit spool 107 and having its suction conduit 128S arranged partly in the spool and exiting at a lower elevation.

The plenum chambers 119 and 120 which constitute the intermediate set have masked wall regions 119W and 120W flanking the liquid spray discharge area and opening into the exit spool 107 to communicate with the discharge and suction conduits from the fan 128. Similarly, the plenum chambers 117 and 118 of the upstream set open into the entrance spool 106 and communicate with the discharge and suction conduits of its recirculation fan 123.

A high velocity gaseous curtain is provided across the mouth of each spool 106 and 107 by arranging the opposite internal face portions of each spool with suitable opposed openings to effect a continuous gas flow pattern directed laterally adjacent to the mouth region. These curtains serve to exclude ambient atmosphere from the process chamber and they are particularly effective where the process chamber is operating at or near atmospheric pressure.

In the arrangement shown in FIGS. 1 to 3, the fact that gaseous nitrogen is withdrawn upstream, through the exhaust conduit 126 at the inlet end, and the fact that fresh gaseous nitrogen is introduced downstream, by virtue of the liquid flashing to gas at this region, results in a temperature profile wherein heat exchange between the cryogenic fluid and the product is optimized. In general, arrows 131 adjacent the upstream end of the spray discharge pattern indicate the manner in which the freshly released gas joins in the transverse flow pattern developed by the intermediate set of plenum chambers 119 and 120. Arrows 132 bridge the high pressure chamber 119 of the intermediate set with the low pressure chamber 118 of the upstream set so that there is a gradual transfer of gaseous nitrogen towards the upstream end of the process chamber.

Optimum heat transfer is effected because the product, when at its warmest state, is exposed to gas at its warmest state within the system; the product when partially cooled is exposed to colder gas; and the product when further cooled is exposed to cryogenic liquid to complete the process.

For purposes of illustrative disclosure, typical values are given for operating the flash freezer apparatus in a practical application involving flash freezing of bakery goods at a rate of 2,500 lbs. per hour. The delivery line 115 from the cryogenic pump 112 handles a rated flow of 5,100 lbs. per hour of cryogenic liquid supplied at a pressure of 6 psi to be spray discharged in distinct wide angle spray patterns by the precision nozzles 109 which, by way of example, may have a ⅛inch diameter orifice and be of the type identified as No. 18B5-5W of Spraying Systems Co.

For bakery goods, the system utilizes about 1 pound of liquid nitrogen for each pound of product. In the example, 2,500 pounds of product are processed per hour so liquid flashes to gas at the spray discharge region at a rate of about 2,500 pounds per hour. The excess is collected in the tray 110 and is drained back to the sump provided by the external dewar 111. Fresh liquid nitrogen is supplied through the make up line 116 which enters through the exit spool 107 and opens directly into the tray 110. The average rate of make up liquid entry is therefore 2,500 pounds per hour, and this liquid also drains into the sump after its release at a point within the chamber.

The temperature of the entering cryogenic liquid is about −320°F. The flow volume of the gas recirculation stream between the intermediate set of plenum chambers 119 and 120 is about 1,000 cubic feet per minute and the gas temperature is about −200°F. The gas recirculation fan 123 for the upstream set of plenum chambers 117 and 118 also has a flow volume of 1,000 cubic feet per minute and at this region the gas is at a temperature of −100°F. A typical value for the drawoff through the exhaust conduit 126 is about 390 cubic feet per minute at a temperature of −100°F. The stream velocity across the intermediate set of plenum chambers is 3,000 feet per minute and the stream velocity across the upstream set of plenum chambers is somewhat less. The total mass flow rate of the gas in these transverse flow streams is substantially greater than the mass rate of liquid flashing to gas in the chamber.

The high volume, high velocity per recirculation creates turbulence at the surface of the product or article and effects better heat transfer. Transverse flow is more efficient as it is easier to achieve high volume and high velocity and it affords a better angle of impingement upon the product.

In the disclosed embodiment, liquid nitrogen is pumped to the spray headers 108U and 108L in a saturated liquid state (all liquid and no gas); the amount of liquid nitrogen sprayed on the product is excess (two to three times as much) of what is actually required to freeze the product; and the excess amount is collected and recirculated back to the spray headers. The spray technique used progessively and repeatedly wipes the surface of the product with liquid nitrogen droplets to promote rapid heat transfer. The gas generated on the surface of the product in the freezing process is penetrated by the liquid nitrogen droplets which leave the spray nozzles with adequate velocity for this purpose.

An accurate metering of liquid nitrogen to the system is not required. The liquid nitrogen level in the exterior sump provided by the dewar 111 is controlled by a simple on-off liquid level controller 111C. As liquid nitrogen is consumed in the freezing process, the level of liquid in the sump will drop and additional liquid is added to the system. Without a liquid recirculating system such as disclosed herein, the precise amount of liquid nitrogen must be added to perform the freezing operation. If an excess is added, inefficient operation will result. If too little is added, the product will not be properly frozen. The progressively deposited, full coverage high velocity spray technique results in very rapid heat transfer between the product and the liquid nitrogen. This results in high production for a relatively small unit. Since the heat transfer loss from a freezer unit to the surrounding atmosphere is a relatively fixed amount for a given size unit, the unit with the higher production rate can pro-rate this loss over a larger amount of product processed.

The entrance and exit conveyor 103 and 104 are housed in insulating ducting providing an entrance tunnel 133 and an exit tunnel 134. Each of these tunnels angles upwardly in a direction away from the process chamber and is maintained filled with cold gaseous nitrogen (which is much denser than ambient air). The process chamber is operated at slightly greater than atmospheric pressure to promote flow of exfiltration of gaseous nitrogen outwardly through each tunnel. This exfiltration is arranged effectively to exclude entry of ambient air and also provides pre-cooling in the case of the entrance tunnel 133 and post-cooling in the case of the exit tunnel 134. The product which has just been deeply frozen by the liquid nitrogen at the downstream end of the process chamber 101 may achieve thermal equilibration during the post-cooling process in the exit tunnel.

The nozzle 117N and 119N are individually rotatable structures to give some axial adjustment of the direction path of the recirculated gaseous stream. By proper adjustment of these nozzles, the exfiltration flows through the tunnels may be balanced or may be otherwise set up according to individual needs.

Thus, while preferred contructional features of the invention are embodied in the structure illustrated herein, it is to be understood that changes and variations may be made by those skilled in the art without departing from the spirit and scope of the appended claims.

What is claimed is:

1. A cryogenic freezer for ultra-fast freezing of products with a cryogenic liquid comprising:
   a. insulated wall means forming an elongated, horizontally extending tunnel having an inlet and an outlet;
   b. conveyor means having at least one reach extending through the interior of said tunnel for conveying a product to be frozen through said tunnel from said inlet to said outlet;
   c. means forming a liquid-product contact zone in said tunnel, said means including conduit means for introducing a cryogenic liquid refrigerant into said tunnel in contact with said product on said conveyor for freezing said product and vaporizing said liquid to form a refrigerant gas;
   d. passage means forming a plurality of distinct, substantially closed, recirculation paths for independently recirculating and refrigerant gas in each of said paths, said recirculation paths being adjacent each other in series along the length of said conveyor for successively contacting the product on the conveyor with the gas recirculating in each path, all of said recirculation paths being positioned between said tunnel inlet and said liquid-product contact zone;
   e. passage means for conducting newly generated refrigerant gas from said liquid-product contact zone into the recirculation path adjacent thereto;
   f. passage means for conducting portions of the refrigerant gas from each recirculation path to the next recirculation path closer to said tunnel inlet such that the average temperature of the gas in each path increases in the direction of the tunnel inlet;
   g. passage means for exhausting a portion of the refrigerant gas from the recirculation path closest to said tunnel inlet; and
   h. gas flow producing means for recirculating the refrigerant gas in each of said recirculation paths at a velocity sufficient to produce turbulent flow of the refrigerant gas in contact with the product.

* * * * *